(12) United States Patent
Jeong

(10) Patent No.: US 7,076,008 B2
(45) Date of Patent: Jul. 11, 2006

(54) METHOD AND APPARATUS FOR ESTIMATING AND CORRECTING GAIN AND PHASE IMBALANCE IN A CODE DIVISION MULTIPLE ACCESS SYSTEM

(75) Inventor: Gibong Jeong, San Diego, CA (US)

(73) Assignee: Texas Instruments Incorporated, Dallas, TX (US)

( * ) Notice: Subject to any disclaimer, the term of this patent is extended or adjusted under 35 U.S.C. 154(b) by 794 days.

(21) Appl. No.: 10/052,993

(22) Filed: Nov. 2, 2001

(65) Prior Publication Data

US 2003/0095589 A1    May 22, 2003

(51) Int. Cl.
*H04L 27/08*  (2006.01)
*H04L 27/06*  (2006.01)

(52) U.S. Cl. ...................... 375/345; 375/344
(58) Field of Classification Search ............... 375/316, 375/343, 346, 140, 147, 150, 344, 345
See application file for complete search history.

(56) References Cited

U.S. PATENT DOCUMENTS

| 4,489,392 | A | * | 12/1984 | Lewis ...................... 708/422 |
| 4,876,489 | A | * | 10/1989 | Cawthorne ................. 342/383 |
| 5,412,351 | A | * | 5/1995 | Nystrom et al. ............ 332/103 |
| 5,705,949 | A | * | 1/1998 | Alelyunas et al. .......... 329/304 |
| 6,330,290 | B1 | * | 12/2001 | Glas ........................ 375/324 |
| 6,442,217 | B1 | * | 8/2002 | Cochran .................... 375/326 |
| 6,574,286 | B1 | * | 6/2003 | McVey ...................... 375/308 |
| 2003/0135532 | A1 | * | 7/2003 | Peting ..................... 708/622 |

OTHER PUBLICATIONS

Huang, Xinping, et al., "I/Q Channel Regeneration in 5-Port Junction Based Direct Receivers," 1999 British Crown Copyright, pp. 169-173.
Cavers, James K., et al., "Adaptive Compensation for Imbalance and Offset Losses in Direct Conversion Transceivers,"IEEE Transactions on Vehicular Technology, vol. 42, No. 4, Nov. 1993, pp. 581-588.

* cited by examiner

*Primary Examiner*—Kenneth Vanderpuye
*Assistant Examiner*—Jason M. Perilla
(74) *Attorney, Agent, or Firm*—Ronald O. Neerings; Wade James Brady, III; Frederick J. Telecky, Jr.

(57) ABSTRACT

Gain and phase imbalance is estimated by using an IQ-swapped spreading sequence in addition to a regular spread pilot signal. The IQ-swapped spreading sequence is the spreading sequence whose real and imaginary components are the imaginary and real components of the regular spreading sequence. The gain imbalance can be estimated by a function of the difference between the real component of a regular despread pilot signal and the imaginary component of the IQ-swapped pilot signal. In a similar fashion, the phase imbalance is estimated by a function of the difference between the imaginary component of a regular despread pilot signal and the real component of the IQ-swapped despread pilot signal. A controller such as a DSP (102) uses the gain and phase imbalance estimates to control a gain and phase correction circuit (104). In one embodiment, the correction circuit (104) includes a plurality of multipliers (202–212) and a ROM look-up-table (202) in order to perform the imbalance correction.

18 Claims, 2 Drawing Sheets

METHOD AND APPARATUS FOR ESTIMATING AND CORRECTING GAIN AND PHASE IMBALANCE IN A CODE DIVISION MULTIPLE ACCESS SYSTEM

TECHNICAL FIELD

This invention relates in general to the field of radio communications and more specifically to a method and apparatus for estimating and correcting the gain and phase imbalance in a Code Division Multiple Access (CDMA) system.

BACKGROUND

In next generation wireless devices, the direct conversion or Zero Intermediate Frequency (ZIF) architecture is the preferred radio architecture. Direct conversion techniques not only allow for flexible channel spacing and multi-band operation, with filtering performed at baseband. But more importantly, it does not require some components that increase the overall size of a transceiver, particularly those components associated with IF filtering.

The practical implementation of a ZIF radio is by no means trivial. There are a number of design problems associated with the architecture. One of the problems is the amplitude and phase mismatch, also known as IQ (In-phase and quadrature) imbalance problem, in the two arms of a quadrature demodulator. Although this IQ imbalance problem also exists in the superheterodyne receiver, it is more problematic in the direct conversion receiver because the direct conversion receiver requires high baseband gain. The IQ imbalance distorts the received signal quality by introducing additional noise to the signal and confusing receiver signal processing functions such as channel estimation and automatic frequency control.

In a CDMA or spread spectrum communication system based on a direct sequence, it is not trivial to estimate the IQ imbalance because a CDMA signal is very weak compared to ambient interference or noise. And because the receiver sequence despreading operation scrambles the IQ imbalance vector. One prior art approach has used a decision-directed adaptive algorithm in the receiver to correct the distortion of the signal constellation. While a second prior art approach uses a plurality of phase-demodulating ports to oversample the signal in the phase domain. By measuring the correlation among those phase-oversampled signals, the receiver can correct the IQ imbalance by signal reconstruction. Both of these approaches are not designed for direct sequence CDMA signals. In a CDMA system, a spread spectrum signal has a very low signal-to-noise ratio, and the prior art approaches based on adaptive schemes are not robust enough and not usable. These mentioned prior art approaches also add extra cost and/or introduce noise to the system. A need thus exist in the art for a method and apparatus for estimating and correcting the gain and phase imbalance that can overcome some of the problems mentioned above.

BRIEF DESCRIPTION OF THE DRAWINGS

The features of the present invention, which are believed to be novel, are set forth with particularity in the appended claims. The invention, may best be understood by reference to the following description, taken in conjunction with the accompanying drawings, in the several figures of which like reference numerals identify like elements, and in which:

DETAILED DESCRIPTION OF THE PREFERRED EMBODIMENT

Figure 1:
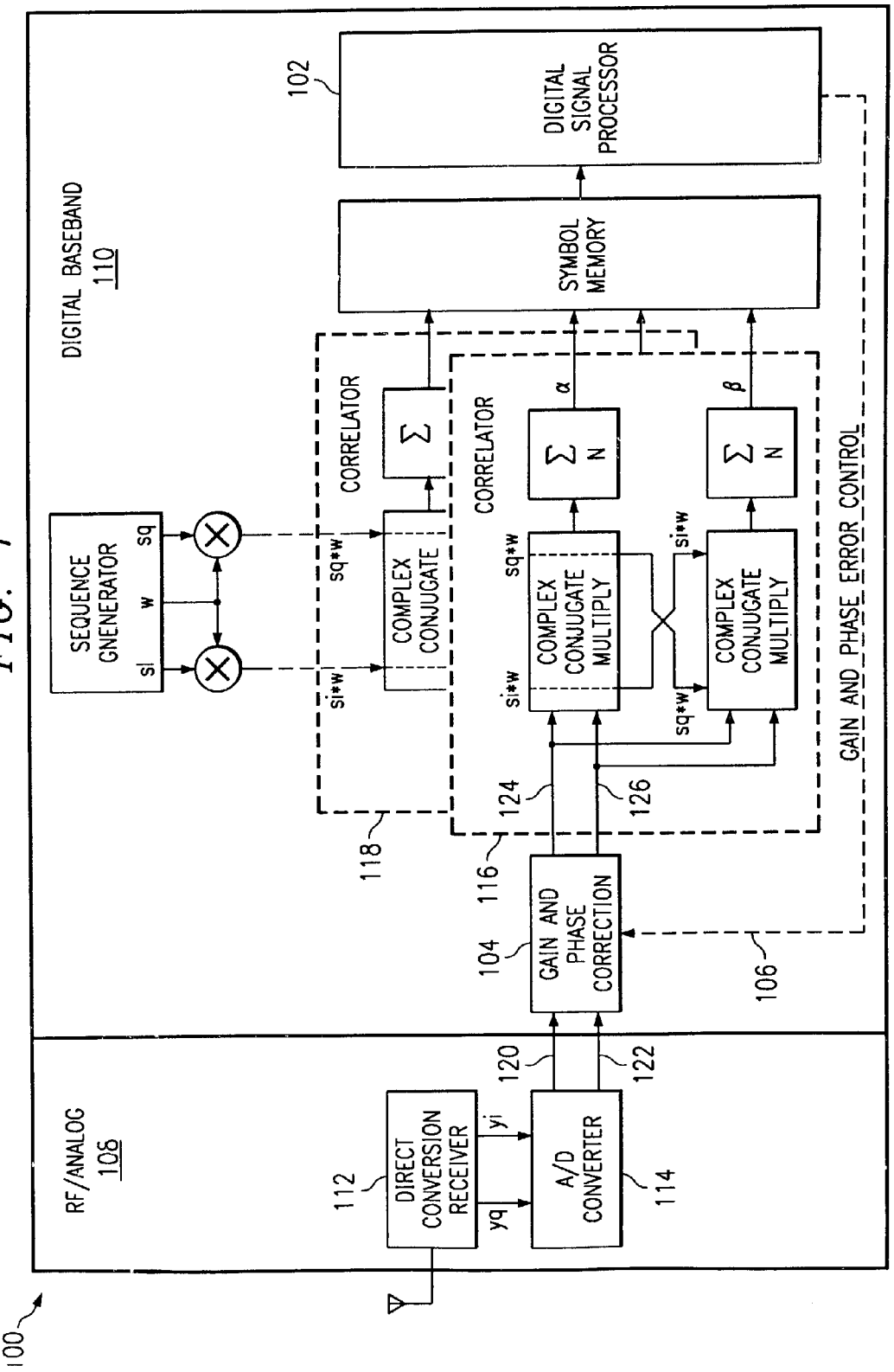
FIG. 1 shows a block diagram of a receiver in accordance with the invention.

While the specification concludes with claims defining the features of the invention that are regarded as novel, it is believed that the invention will be better understood from a consideration of the following description in conjunction with the drawing figures.

This invention presents a method and apparatus for compensating for the IQ imbalance in a direct sequence CDMA systems by digital signal processing and thus enabling the direct conversion receiver to convert a spread spectrum passband signal to a clean digital baseband signal without incurring much extra noise. This invention eases the IQ offset requirement on RF and analog chips and lowers the cost of a mobile receiver.

Most CDMA systems provide a pilot signal. This invention estimates the gain and phase imbalance by monitoring the constellation of the despread pilot signal because despreading gives processing gain and boosts up the quality of the pilot signal. The pilot constellation is distorted by the gain and phase imbalance. The despread pilot signal is not however sufficient to determine both gain and phase imbalance because the receiver is not aware of the actual pilot strength or amplitude. Given this, the present invention uses the IQ-swapped spreading sequence in addition to the regular spread pilot. The IQ-swapped spreading sequence is the spreading sequence whose real and imaginary components are the real and imaginary components of the regular spreading sequence as shown in the attached figure. As proved in the attached sheet, the gain imbalance can be estimated by a function of the real component of the pilot symbol despread by the normal spreading sequence and the imaginary component of the pilot symbol despread by the IQ-swapped spreading sequence. In a similar fashion, the phase imbalance can be estimated by a function of the pilot symbol despread by the normal sequence and the pilot symbol despread by the IQ-swapped spreading sequence.

Since the IQ imbalance varies extremely slowly, in the preferred embodiment a communication receiver 100 as shown in FIG. 1 includes a controller such as a digital signal processor 102 that averages or filters the estimates over a long period in order to get a good measurement. The digital signal processor 102 uses the estimates to control the correction block 104 using gain and phase error control signals 106. In the preferred embodiment, the correction block 104 performs four real multiplications in essence implementing a 2-by-2 matrix.

Receiver 100 includes an radio frequency and analog front-end section 108 and a digital baseband section 110. The front-end section 108 includes a direct conversion receiver block 112 and an analog-to-digital (A/D) converter 114 which converts the analog output from the direct conversion receiver block 112 and outputs digital signals to the digital baseband section 110 as known in the art.

Gain/Phase Imbalance Correction

To write the quadrature modulation and demodulation concisely, we can represent a complex envelope as a two-dimensional column vector containing the real and imaginary components. Then the CDMA signal spread by a complex spreading sequence at the transmitter baseband output can be represented by the following matrix equation. Here we ignore the channelization code (w) of the pilot signal without loss of generality.

$$x = Sd,$$

$$x = \begin{bmatrix} x_I \\ x_Q \end{bmatrix}$$

is the transmitted chip signal, $$S = \begin{bmatrix} p_I & -p_Q \\ p_Q & p_I \end{bmatrix}$$

is the spreading sequence matrix, $p_I$ and $P_Q$ are the real and imaginary part of the complex spreading sequences, $$d = \begin{bmatrix} d_I \\ d_Q \end{bmatrix}$$

is the data symbol. For the pilot, $$d = \begin{bmatrix} 1 \\ 0 \end{bmatrix}.$$

The received signal is corrupted by a fading channel and interference.

$$y = Cx + n,$$

$$y = \begin{bmatrix} y_I \\ y_Q \end{bmatrix}$$

is the received signal, $$C = a \begin{bmatrix} \cos\phi & -\sin\phi \\ \sin\phi & \cos\phi \end{bmatrix}$$

is the fading channel response matrix, a is the channel gain, $\phi$ is the channel phase rotation, and n is the interference.

The quadrature demodulator introduces dc offset and gain and phase offset. The real and imaginary parts of the quadrature demodulator output are denoted as follows:

$$y_{dI} = g_I \cos\left(-\frac{\theta}{2}\right) y_I + g_I \sin\left(-\frac{\theta}{2}\right) y_Q + o_I,$$

$$y_{dQ} = g_Q \cos\left(\frac{\pi}{2} + \frac{\theta}{2}\right) y_I + g_Q \sin\left(\frac{\pi}{2} + \frac{\theta}{2}\right) y_Q + o_Q.$$

This quadrature demodulator operation can be represented concisely by the following matrix equation.

$$y_d = \Gamma \Phi (y + o)$$

$$\Phi = \Phi\left(\frac{\theta}{2}\right) = \frac{1}{\cos\frac{\theta}{2} - \sin\frac{\theta}{2}} \begin{bmatrix} \cos\frac{\theta}{2} & -\sin\frac{\theta}{2} \\ -\sin\frac{\theta}{2} & \cos\frac{\theta}{2} \end{bmatrix}$$

$$\Gamma = \begin{bmatrix} g_I & 0 \\ 0 & g_Q \end{bmatrix}$$

Here $$o = \begin{bmatrix} o_I \\ o_Q \end{bmatrix}$$

is the DC offset vector, $\theta$ is the phase splitter error and $g_I$, $g_Q$ are the gains of the real and imaginary components, respectively. For symmetry, the phase splitter error has been distributed equally between I and Q channels. For power conservation, let us assume $$g_I^2 + g_Q^2 = 2$$

We can define the gain ratio $\gamma$ and gain imbalance $\epsilon$ as $$\gamma = \frac{g_I}{g_Q}, \varepsilon = \gamma - 1$$

Then, we can represent each gain in terms of $\gamma$:

$$g_I = \gamma \sqrt{\frac{2}{1+\gamma^2}}, g_Q = \sqrt{\frac{2}{1+\gamma^2}}.$$

Now in order to overcome the fading channel represented by a matrix C, the digital signal processor 102 in the receiver corrects the channel phase rotation $\phi$ and amplifies the amplitude by the channel gain a, after despreading. Note that other types of weighting than scaling by the channel gain can be used to improve the performance. The quadrature despreading and the channel phase correction and weighting can be represented as $$C^T S^T y_d = C^T S^T \Gamma \Phi (CSd + n + o).$$

Then, ignoring the DC offset (o=0) and assuming the unit channel gain (a=1), we can represent the receiver output $y_d$ with the overall system matrix H as follows:

$$y_d = Hd + m, \quad m = C^T S^T \Gamma \Phi n,$$

$$H = C^T S^T \Gamma \Phi C S =$$

$$g_I R\left(-\frac{\theta}{2}\right) + g_Q R\left(\frac{\theta}{2}\right) + p_I p_Q \begin{bmatrix} (g_I + g_Q)\sin\frac{\theta}{2} & -(g_I - g_Q)\cos\frac{\theta}{2} \\ -(g_I - g_Q)\cos\frac{\theta}{2} & -(g_I + g_Q)\sin\frac{\theta}{2} \end{bmatrix},$$

and $$R(\theta) = \begin{bmatrix} \cos\theta & -\sin\theta \\ \sin\theta & \cos\theta \end{bmatrix}$$

Note that m is colored noise. If n has white spectrum with variance n0, the covariance matrix of m is equal to $$\Delta_m = n_0 \Gamma^2 \Phi \Phi^T.$$

Then, if $p_I$ and $p_Q$ are uncorrelated as in typical systems, the average value of the despread pilot is given by $$\alpha = E\left[H \begin{bmatrix} 1 \\ 0 \end{bmatrix}\right] = \begin{bmatrix} (g_I + g_Q)\cos\frac{\theta}{2} \\ (g_I - g_Q)\sin\frac{\theta}{2} \end{bmatrix}. \quad \text{Equation 1}$$

On the other hand, for the I/Q swapped spreading sequence, the overall system can be represented by the following:

$$y_s = H_s d + m, \quad m = C^T S_s^T \Gamma \Phi n$$

$$H_s = C^T S_s^T \Gamma \Phi C S =$$

$$-g_I R_s\left(\frac{\theta}{2}\right) + g_Q R_s\left(-\frac{\theta}{2}\right) + p_I p_Q \begin{bmatrix} (g_I + g_Q)\cos\frac{\theta}{2} & -(g_I - g_Q)\sin\frac{\theta}{2} \\ (g_I - g_Q)\sin\frac{\theta}{2} & (g_I + g_Q)\cos\frac{\theta}{2} \end{bmatrix}$$

$$S_s = \begin{bmatrix} p_Q & -p_I \\ p_I & p_Q \end{bmatrix}$$

is the I/Q-swapped spreading sequence matrix, $$R_s(\theta) = \begin{bmatrix} \sin\theta & \cos\theta \\ \cos\theta & -\sin\theta \end{bmatrix}$$

Then, the average of the pilot despread by the I/Q-swapped spreading sequence is given by $$\beta = E\left[H_s \begin{bmatrix} 1 \\ 0 \end{bmatrix}\right] = \begin{bmatrix} -(g_I + g_Q)\sin\frac{\theta}{2} \\ -(g_I - g_Q)\cos\frac{\theta}{2} \end{bmatrix}. \quad \text{Equation 2}$$

From equation (1) and (2), we can express the estimation of mismatch in gain and phase as $$\hat{\gamma} = \frac{g_I}{g_Q} = \frac{\alpha_I - \beta_Q}{\alpha_I + \beta_Q},$$

$$\hat{\theta} = 2\tan^{-1}\alpha_Q - \frac{\beta_I}{\alpha_I - \beta_Q} = -2\tan^{-1}\frac{\alpha_Q + \beta_I}{\alpha_I + \beta_Q}.$$

Based on the estimated γ and θ, the gain and phase correction block in FIG. 1 implements the following matrix multiplication.

$$X(\gamma, \theta) =$$

$$\Phi^{-1}\Gamma^{-1} = \Phi\left(-\frac{\theta}{2}\right)\Gamma^{-1} = \frac{1/g_Q}{\cos(\theta/2) + \sin(\theta/2)} \begin{bmatrix} \frac{\cos(\theta/2)}{\gamma} & \sin(\theta/2) \\ \frac{\sin(\theta/2)}{\gamma} & \cos(\theta/2) \end{bmatrix}$$

$$\hat{y}_d = X y_d$$

This method lends itself well to the Rake receiver wherein multiple demodulator output are phase-corrected, weighted and combined. A channel estimation algorithm provides an estimation of the channel gain and phase rotation. Each demodulator with index i is associated with a pair of the pilot symbol despread by a normal spreading sequence and the pilot symbol despread by the I/Q-swapped spreading sequence: $\alpha_i$ and $\beta_i$. Then, the maximal ratio combining is applied to each despread pilot pair ($\alpha_i$, $\beta_i$) from F demodulators:

$$\alpha = \sum_{f=1}^{F} \alpha_i = \begin{bmatrix} \alpha_I \\ \alpha_Q \end{bmatrix}, \beta = \sum_{f=1}^{F} \beta_i = \begin{bmatrix} \beta_I \\ \beta_Q \end{bmatrix}.$$

This maximal ratio combining increases the reliability of the gain and phase mismatch estimation in the presense of multipath fading channel.

The proposed method can be simplified in some applications. For instance, in a closed-loop controlled gain/phase correction wherein only the sign/polarity of the gain/phase error matters, the following signals can be used for driving the error control loop:

$$\hat{\gamma}_e = \alpha_I - \beta_Q,$$

$$\hat{\theta}_e = \alpha_Q + \beta_I.$$

Furthermore, the proposed method can be implemented in an iterative way. The gain/phase mismatch estimation relies upon a correct channel estimation while the channel estimation in turn is degraded by the gain/phase mismatch. First, a raw channel estimation is used to estimate the gain/phase mismatch. The gain/phase mismatch is corrected according to the initial estimation. After the correction, the channel response now can be estimated with a better accuracy. Then, the gain/phase mismatch can be estimated with a better accuracy by the improved channel estimation. In this iterative fashion, the gain/phase estimation can be made robust to the channel estimation error.

Figure 2:
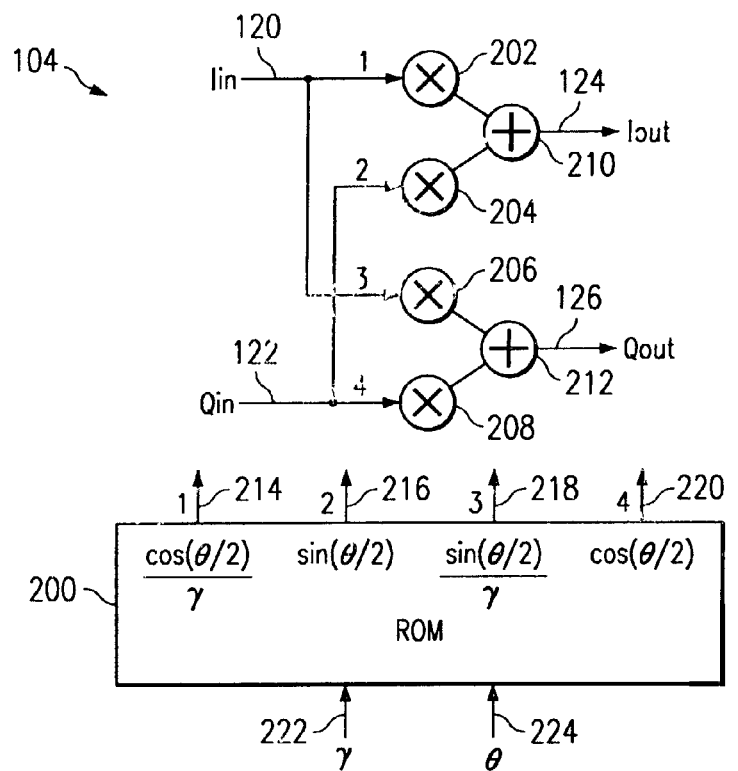
FIG. 2 shows a gain and phase correction block in accordance with the invention.

In an actual implementation of the correction block as shown in FIG. 2, the common gain part can be omitted and the sinusoid can be generated by a look-up table 202.

Look-up table 202 can reside in a Read-Only Memory (ROM) or other storage device. The gain and phase correction circuit 104 includes first 120 and second 122 input ports, and four multipliers 202–208 and two adders 210–212. A storage device such as a read-only memory (ROM) 202 has four output ports 214, 216, 218, 220 that provide the correct sinusoid to the respective multipliers 202, 204, 206 and 208, responsive to receiving the estimate signal for the gain 222 and phase 224 imbalance. The corrected I signal 124 is provided on a first output port, while the corrected Q signal 126 is provided in a second ouput port.

Figure 3:
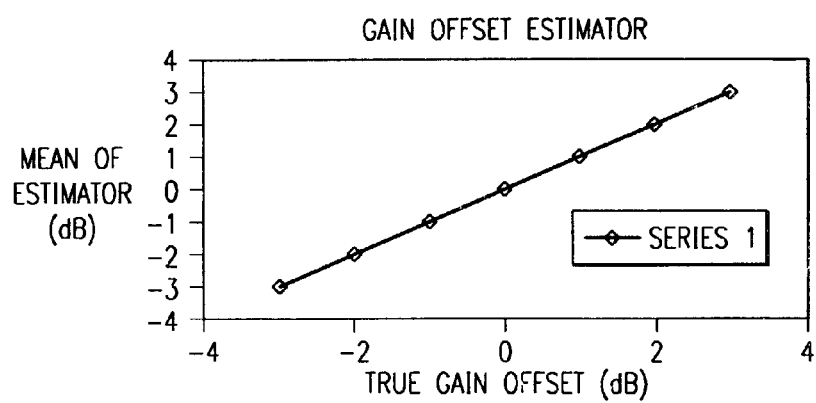
FIG. 3 shows a graph showing mean of the gain offset estimator versus true gain offset.
Figure 4:
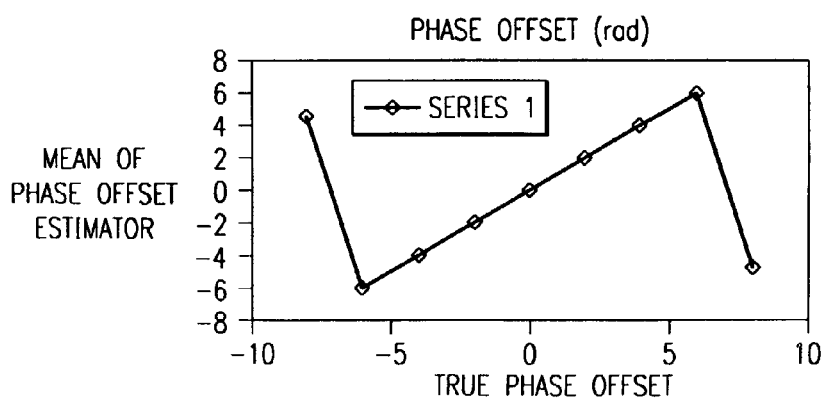
FIG. 4 shows a graph showing mean of the phase offset estimator versus true phase offset.

In FIG. 3, there is shown a graph showing the mean of the estimator ($20*\log_{10}E[\hat{\gamma}]$) versus the true gain offset for a 100 pilot symbol simulation. While FIG. 4 shows a graph highligtening the mean of the phase offset estimator ($E[\hat{\theta}]$) for a 100 pilot symbol.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

The invention claimed is:

1. A circuit, comprising:
   a direct conversion receiver coupled to receive a radio frequency signal and produce an analog signal;
   an analog to digital converter coupled to receive the analog signal and produce baseband digital input signals having real and imaginary components; and
   a digital baseband circuit, comprising:
   first and second input ports for receiving the digital input signals; and
   a controller coupled to the first and second input ports for estimating the gain and phase imbalance of the digital input signals, wherein the controller estimates the gain mismatch as;

$$-\hat{\gamma} = \frac{g_I}{g_Q} = \frac{\alpha_I - \beta_Q}{\alpha_I + \beta_Q},$$

where $g_I$, $g_Q$ are the gains of the real and imaginary components of the digital input signals, $\alpha_I$ is a pilot symbol despread by a normal spreading sequence and $\beta_Q$ is the pilot symbol despread by an IQ-swapped spreading sequence.

2. A digital baseband circuit as defined in claim 1, wherein the controller comprises a digital signal processor.

3. A digital baseband circuit as defined in claim 1, wherein the controller estimates the phase mismatch as:

$$\hat{\theta} = 2\tan^{-1}\frac{\alpha_Q - \beta_I}{\alpha_I - \beta_Q} = -2\tan^{-1}\frac{\alpha_Q + \beta_I}{\alpha_I + \beta_Q},$$

wherein $\alpha_I$ and $\alpha_Q$ are pilot symbols despread by a normal spreading sequence and $\beta_I$ and $\beta_Q$ are pilot symbols despread by an I/Q-swapped spreading sequence.

4. A digital baseband circuit as defined in claim 1, further comprising:
   a gain and phase correction circuit coupled to the first and second input ports.

5. A digital baseband circuit as defined in claim 4, wherein the gain and phase correction circuit includes first and second multipliers coupled to the first input port and third and fourth multipliers coupled to the second input port.

6. A digital baseband circuit as defined in claim 5, wherein the gain and phase correction circuit further comprises a look-up-table coupled to the first, second, third and fourth multipliers.

7. A digital baseband circuit as defined in claim 6, wherein the look-up-table comprises a read-only memory (ROM).

8. A digital baseband circuit as defined in claim 4, wherein the controller estimates the phase mismatch as:

$$\hat{\theta} = 2\tan^{-1}\frac{\alpha_Q - \beta_I}{\alpha_I - \beta_Q} = -2\tan^{-1}\frac{\alpha_Q + \beta_I}{\alpha_I + \beta_Q},$$

wherein $\alpha_I$ and $\alpha_Q$ are pilot symbols despread by a normal spreading sequence and $\beta_I$ and $\beta_Q$ are pilot symbols despread by an I/Q-swapped spreading sequence; and
   the gain and phase correction circuit uses phase and gain estimates to provide a gain and phase correction to the digital input signals.

9. A digital baseband circuit as defined in claim 8, wherein the gain and phase correction circuit applies correction to the digital input signals using the formula:

$$X(\gamma, \theta) = \frac{1/g_Q}{\cos(\theta/2) + \sin(\theta/2)}\begin{bmatrix} \frac{\cos(\theta/2)}{\gamma} & \sin(\theta/2) \\ \frac{\sin(\theta/2)}{\gamma} & \cos(\theta/2) \end{bmatrix}.$$

10. A method for estimating a gain and phase imbalance of digital signals in a direct sequence code division multiple access system, comprising the steps of:
    estimating the gain imbalance as follows:

$$\hat{\gamma} = \frac{g_I}{g_Q} = \frac{\alpha_I - \beta_Q}{\alpha_I + \beta_Q},$$

where $g_I$, $g_Q$ are the gains of a real component and an imaginary component of the digital input signals, $\alpha_I$ is a pilot symbol despread by a normal spreading sequence and $\beta_Q$ is the pilot symbol despread by an I/Q-swapped spreading sequence; and
    estimating the phase imbalance as follows:

$$\hat{\theta} = 2\tan^{-1}\frac{\alpha_Q - \beta_I}{\alpha_I - \beta_Q} = -2\tan^{-1}\frac{\alpha_Q + \beta_I}{\alpha_I + \beta_Q},$$

where $\alpha_I$ and $\alpha_Q$ are pilot symbols despread by a normal spreading sequence and $\beta_I$ and $\beta_Q$ are pilot symbols despread by an I/Q-swapped spreading sequence.

11. A method as defined in claim 10, further comprising the step of: using the gain and phase imbalance estimates to correct for the gain and phase imbalance in the digital signals, using the formula:

$$X(\gamma, \theta) = \frac{1/g_Q}{\cos(\theta/2) + \sin(\theta/2)} \begin{bmatrix} \frac{\cos(\theta/2)}{\gamma} & \sin(\theta/2) \\ \frac{\sin(\theta/2)}{\gamma} & \cos(\theta/2) \end{bmatrix}.$$

12. A method as defined in claim 11, wherein the correction of the gain and phase imbalance is performed by a gain and phase correction circuit having a plurality of multipliers, and a look-up-table providing the plurality of multipliers gain and phase offset correction information based on gain and phase imbalance information.

13. A method of estimating an amplitude mismatch in a receiver, comprising the steps of:
   (a) determining a real component of a pilot signal despread by a regular sequence;
   (b) determining an imaginary component of the pilot signal despread by an I/Q-swapped spreading sequence; and
   (c) finding a difference between the real component of the pilot signal despread by the regular sequence and the imaginary component of the pilot signal despread by the I/Q-swapped spreading sequence.

14. A method as defined in claim 13, wherein steps (a) and (b) are performed by a correlator.

15. A method as defined in claim 14, wherein step (c) is performed by a digital signal processor.

16. A method of estimating a phase mismatch in a receiver, comprising the steps of:
   (a) determining an imaginary component of a pilot signal despread by a regular sequence;
   (b) determining a real component of the pilot signal despread by an I/Q swapped spreading sequence; and
   (c) finding the difference between the imaginary component of the pilot signal despread by the regular sequence and the real component of the pilot signal despread by the I/Q swapped spreading sequence.

17. A method as defined in claim 16, wherein steps (a) and (b) are performed by a correlator.

18. A method as defined in claim 17, wherein step (c) is performed by a digital signal processor.

* * * * *